US007142534B1

(12) United States Patent
Whent et al.

(10) Patent No.: US 7,142,534 B1
(45) Date of Patent: Nov. 28, 2006

(54) ARRANGEMENT FOR PROTOCOL INDEPENDENT TRANSFER OF CONTROL PARAMETERS ACROSS INTERNETWORKS USING GENERIC TRANSPARENCY DESCRIPTOR OBJECTS

(75) Inventors: Robert W. Whent, Fingringhoe Colchester (GB); Anthony D. Pike, Purcellville, VA (US); Michael P. Hammer, Reston, VA (US); Taiqi Fu, San Ramon, CA (US); Thang T. Do, Cupertino, CA (US); Henry L. Fourie, Los Gatos, CA (US)

(73) Assignee: Cisco Technology, Inc., San Jose, CA (US)

( * ) Notice: Subject to any disclaimer, the term of this patent is extended or adjusted under 35 U.S.C. 154(b) by 920 days.

(21) Appl. No.: 10/122,238

(22) Filed: Apr. 16, 2002

(51) Int. Cl.
*H04L 12/66* (2006.01)

(52) U.S. Cl. .................................. 370/352; 370/389

(58) Field of Classification Search ........ 370/352–358, 370/373, 377, 384, 389, 386, 42, 395.2, 385, 370/392, 494, 495, 496, 395.5
See application file for complete search history.

(56) References Cited

U.S. PATENT DOCUMENTS 5,732,130 A * 3/1998 Iapalucci et al. ...... 379/221.12
6,324,280 B1 * 11/2001 Dunn et al. ................ 379/230
6,735,209 B1 * 5/2004 Cannon et al. ............. 370/401
6,842,447 B1 * 1/2005 Cannon ...................... 370/352
6,888,839 B1 * 5/2005 Scoggins et al. ........... 370/410
2002/0141381 A1 * 10/2002 Gawargy et al. ........... 370/352
2002/0159439 A1 * 10/2002 Marsh et al. ............... 370/352

* cited by examiner

*Primary Examiner*—Brenda Pham
(74) *Attorney, Agent, or Firm*—Leon R. Turkevich

(57) ABSTRACT

A network node, configured for interfacing between a source network having a source telephony protocol and a packet network configured for sending and receiving data according to Internet Protocol, is configured for generating an IP based transport message for transport of normalized information describing a signaling message received from the source network according to the source telephony protocol. The network node is configured for generating a generic transparency descriptor having generic attributes for describing the signaling message. The generic attributes include a protocol name that specifies the source telephony protocol relative to a prescribed set of source telephony protocol types, and a message identifier that specifies the message type according to the source telephony protocol. Optional attributes specifying respective parameters based on the particular signaling message also may be generated. The network node outputs the transport message having the generic transparency descriptor, enabling any node receiving the transport message to determine whether signaling operations specified by the signaling message can be executed, or whether alternate operations substituting for the signaling operations can be performed based on the generic transparency descriptor.

94 Claims, 8 Drawing Sheets

| MIME Media Content Type = "application/GTD" | ~70 |
| --- | --- |
| Protocol Name (PRN) | ~72 |
| Recognized and/or Unrecognized Message Type | ~76 |
| Recognized and/or Unrecognized Parameter Type | ~78 |
| Recognized and/or Unrecognized Field Tag | ~80 |
| Recognized and/or Unrecognized Field Value | ~82 |
Figure 4
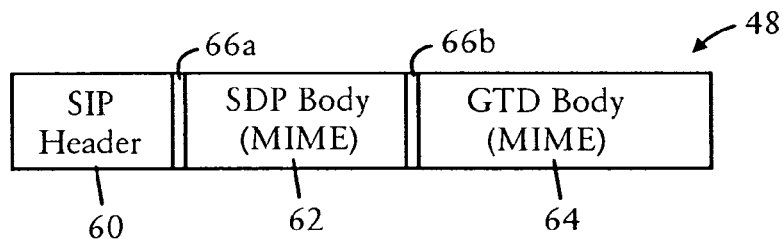
Figure 5
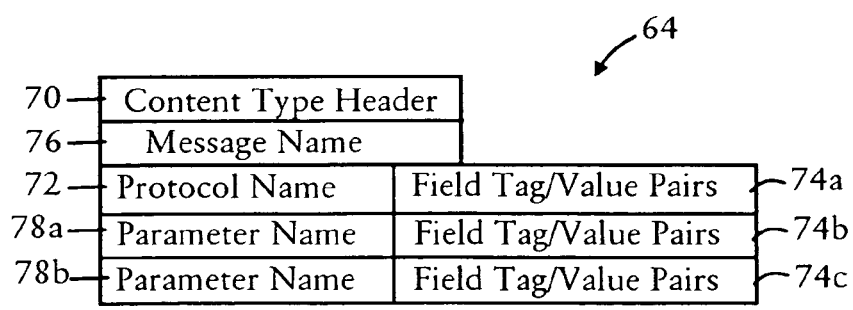
Figure 6

ARRANGEMENT FOR PROTOCOL INDEPENDENT TRANSFER OF CONTROL PARAMETERS ACROSS INTERNETWORKS USING GENERIC TRANSPARENCY DESCRIPTOR OBJECTS

BACKGROUND OF THE INVENTION

1. Field of the Invention

The present invention relates to transfer of signaling parameters, generated according to a prescribed source telephony protocol of a source network, to a destination via a transport network having a transport protocol distinct from the source and destination networks.

2. Description of the Related Art

Existing voice over IP protocols, for example session initiation protocol (SIP) and H.323, are limited in their respective abilities of transporting SS7 signaling information from a source network, for example a TDM based PSTN network, to a destination PSTN system via an Internet Protocol (IP) transport network. For example, an edge device serving as an interface between a TDM network and an IP network may filter certain parameters of ISDN User Part (ISUP) messages and transport a subset of ISUP parameters to a destination. Consequently, many features implemented in a conventional TDM based public switched telephone network cannot currently be performed within an IP domain.

For example, a decision about whether and how to route calls is restricted, based in part on an assumption in Internet Protocol that user terminals (e.g., call agents, access gateways, etc.) control whether and how calls are routed. However, many service providers having transport networks configured for providing transport services between networks may prefer to maintain control within their transport networks, and provide features based on control from nodes within their networks.

FIG. 1 is a diagram illustrating a prior art internetworking arrangement. The internetwork 10 includes a source network 12, a destination network 14, and transport networks 16a and 16b for transport of signaling and media connections between the source and destination networks 12 and 14. As illustrated in FIG. 1, the transport network 16a is configured as an IP packet network, and the transport network 16b is configured as an ATM packet network. The PSTN 12, implemented for example by a local exchange carrier, may implement ISUP protocol ("ISUP-X") 20a using certain enhanced proprietary features for enhancing processing. The PSTN network 14 may be deployed as a network utilizing ISUP protocol ("ISUP-Y") 20b having a different set of proprietary features relative to the ISUP protocol "ISUP-X" 20a of the PSTN network 12.

The IP packet network 16a, implemented for example using Session Initiation Protocol for Telephones (SIP-T) protocol, is configured for transporting signaling and media messages between the PSTN network 12 and the PSTN network 14 via transit services softswitches 18a and 18c. The SIP-T protocol is a peer to peer or proxy-able rendevous protocol where end devices, for example user agents (UAs), initiate multimedia or instant messaging sessions. The SIP-T protocol defines the signaling mechanism for multimedia calls and conferences, and uses several existing protocols established by the Internet Engineering Task Force (IETF) to provide message formatting, media negotiation (using Session Description Protocol (STP)), media transport (using Realtime Transport Protocol (RTP)), name resolution and name mobility support (using Dynamic Host Configuration Protocol (DHCP) and Domain Naming Service (DNS) queries), and application encoding (using Multipurpose Internet Mail Extension (MIME)).

The SIP-T protocol is an enhancement of the SIP protocol, in that SIP-T messages can carry existing ISUP or Q.SIG (a protocol used to for communications between private branch exchanges (PBXs) control messages as a payload. In particular, the SIP-T payload is defined as a MIME body part using the binary native encoding format. Hence, SIP-T can provide ISUP transparency over an IP network, so long as the end points 18 utilize the same SIP-T protocol, and so long as the source network and the destination network use the same version of ISUP. Hence, full ISUP transparency over an IP network 16a cannot be achieved without the networks 12, 14, and their respective gateways 18a and 18c utilizing the same ISUP protocol. In addition, the transport of proprietary ISUP parameters as SIP-T parameters still may result in loss of the proprietary ISUP parameters if the gateway 18 implementing the ISUP to SIP-T translation does not precisely map the proprietary ISUP into SIP-T parameters.

A fundamental problem with internetworking different telephony networks 12 and 14 via an IP network 16a is that multiple proprietary variations of ISUP protocol are implemented by service providers. Hence, encapsulation of proprietary ISUP features for transfer via an IP packet network 16a is only effective if the call agent 18c servicing the destination telephone network also services the same operator using the same proprietary ISUP protocol. However, if the call needs to be sent outside the customer's specific network, for example to another carrier or internationally, the proprietary ISUP features cannot be utilized due to the inability at the destination to recognize the proprietary ISUP protocol.

The ATM packet network 16b illustrates an alternate transport network used for internetwork communications. In particular, the ATM packet network 16b is configured for supporting Bearer Independent Call Control (BICC) protocol, established by the International Telecommunication Union Telecommunication Standardization Sector (ITU-T). In particular, the ITU-T "Study Group 11" developed the BICC (ITU-T recommendation 1901) for introducing a fast packet switch infrastructure into a narrowband circuit switched network such as the PSTN networks 12, 14.

The BICC protocol, based on ISUP, is binary and highly structured, and is not native to the Internet domain. In addition, the BICC protocol favors continued use of limiting SS7 format characteristics, and may also result in multiple BICC variants as existing in ISUP.

Hence, there is a concern that a proprietary ISUP variant 20a, (e.g., ISUP-X) may not be recognizable by another ISUP variant 20b (e.g., ISUP-Y), resulting in loss of functionality as the calls are processed between the TDM networks 12 and 14.

Another concern is that the method of encapsulating ISUP information by a gateway 18 for tunneling via the IP packet network 16a prevents an intermediate node resident within the IP packet network 16a from being able to provide relevant services; for example, intermediate nodes forwarding the native packet may not be able to parse the packet in order to interpret the proprietary ISUP features encapsulated within the packets.

SUMMARY OF THE INVENTION

There is a need for an arrangement that enables signaling parameters to be transported across an IP based network, without loss of information resulting from filtering or translation of parameters.

There also is a need for an arrangement that enables a network node within an IP based network to determine features to be performed for packets having parameters generated according to a source telephony protocol, even if the intermediate node is unable to interpret the source telephony protocol.

These and other needs are attained by the present invention, where a network node, configured for interfacing between a source network having a source telephony protocol and a packet network configured for sending and receiving data according to Internet Protocol, is configured for generating an IP based transport message for transport of normalized information describing a signaling message received from the source network according to the source telephony protocol. The network node is configured for generating a generic transparency descriptor having generic attributes for describing the signaling message. The generic attributes include a protocol name that specifies the source telephony protocol relative to a prescribed set of source telephony protocol types, and a message identifier that specifies the message type according to the source telephony protocol. Optional attributes specifying respective parameters based on the particular signaling message also may be generated. The network node outputs the transport message having the generic transparency descriptor, enabling any node receiving the transport message to determine whether signaling operations specified by the signaling message can be executed, or whether alternate operations substituting for the signaling operations can be performed based on the generic transparency descriptor.

Hence, a network node receiving the transport message may be able to perform either the signaling operations specified by the signaling message, or at least alternate operations substituting for the signaling operations, depending on whether the receiving network node, upon interpreting the generic transparency descriptor, determines whether it has sufficient capabilities for executing alternate operations. Hence, the receiving network node may be able to provide signaling operations for a received signaling message, even though the signaling operations are originally specified using a source telephony protocol not recognizable by the receiving network node.

One aspect of the present invention provides a method in a network node configured for interfacing between a source network having a source telephony protocol and a packet network configured for sending and receiving data according to Internet Protocol. The method includes receiving a signaling message from the source network according to the source telephony protocol, the signaling message specifying a signaling operation to be executed according to the source telephony protocol. The method also includes generating an IP-based transport message having a generic transparency descriptor specifying generic attributes for describing the signaling message, the generic attributes including a protocol name that specifies the source telephony protocol relative to a prescribed set of source telephony protocol types, and a message identifier that specifies a message type according to the source telephony protocol, and outputting the IP-based transport message, having the generic transparency descriptor, to a node via the packet network.

Another aspect of the present invention provides a method in a network node configured for interfacing between a packet network configured for sending and receiving data according to Internet Protocol and a destination network having a destination telephony protocol. The method includes receiving an IP-based transport message having a generic transparency descriptor specifying generic attributes for describing a signaling message generated by a source network according to a source telephony protocol, the generic attributes including a protocol name and a message identifier. The method also includes determining the source telephony protocol relative to a prescribed set of source telephony protocol types based on parsing the protocol name, and a message type for the signaling message according to the source telephony protocol based on parsing the message identifier, and selectively generating the signaling message according to the destination telephony protocol based on the source telephony protocol and the determined message type. A new signaling message is selectively output onto the destination network, representing the signaling message according to the destination telephony protocol.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, where elements having the same reference numeral designations indicate like elements throughout and wherein:

FIG. 4 is a diagram illustrating a descriptor structure hierarchy used by the gateway nodes of FIGS. 2 and 3 in generating the generic transparency descriptor based on recognized and unrecognized values in the received signaling message.

FIG. 5 is a diagram illustrating a structure of an IP-based SIP transport message carrying a generic transparency descriptor body as a MIME body, according to an embodiment of the present invention.

FIG. 6 is a diagram illustrating in further detail the generic transparency descriptor body of FIG. 5, according to an embodiment of the present invention.

BEST MODE FOR CARRYING OUT THE INVENTION

Figure 1:
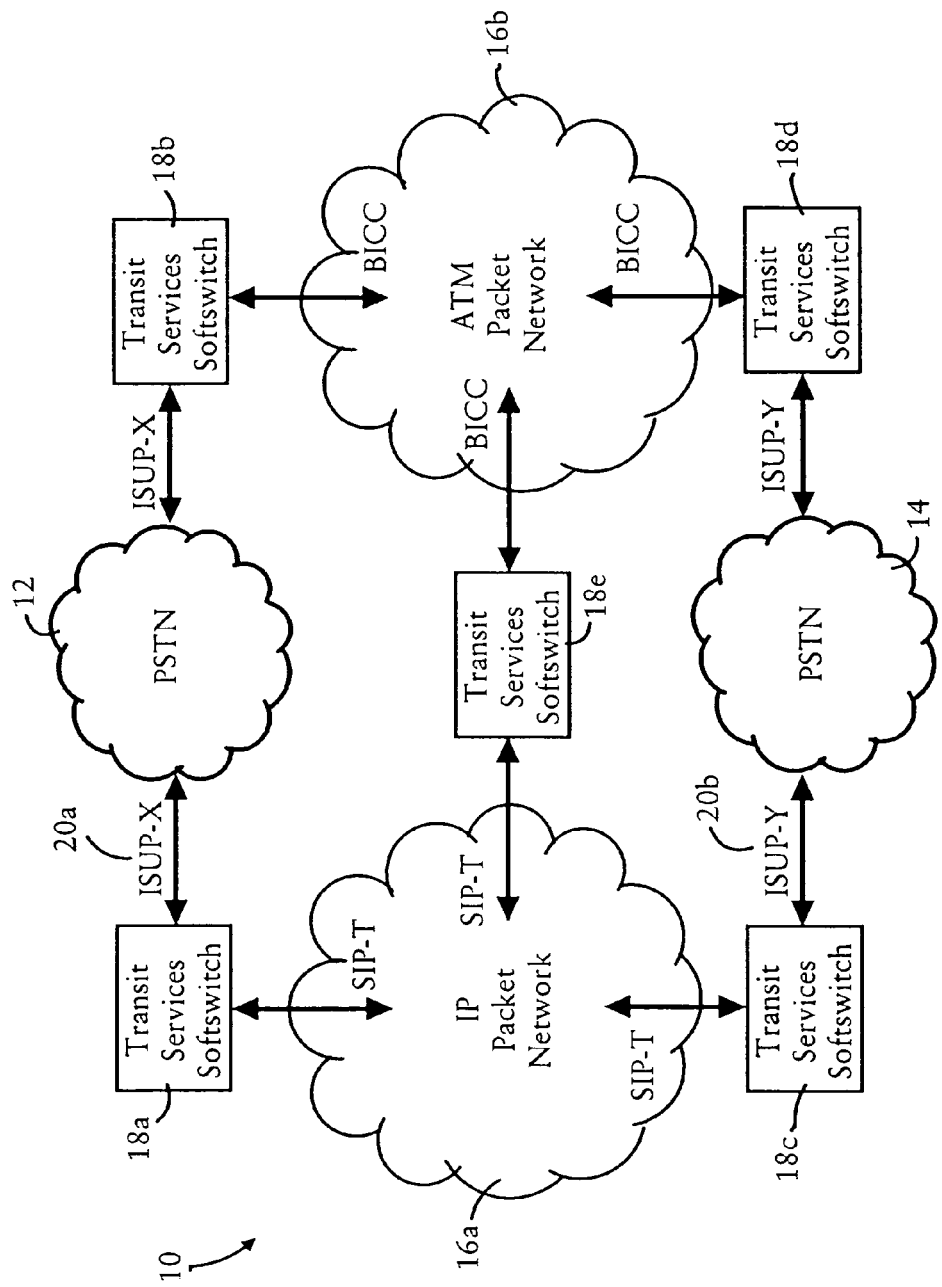
FIG. 1 is a diagram illustrating a prior art internetworking arrangement.
Figure 2:
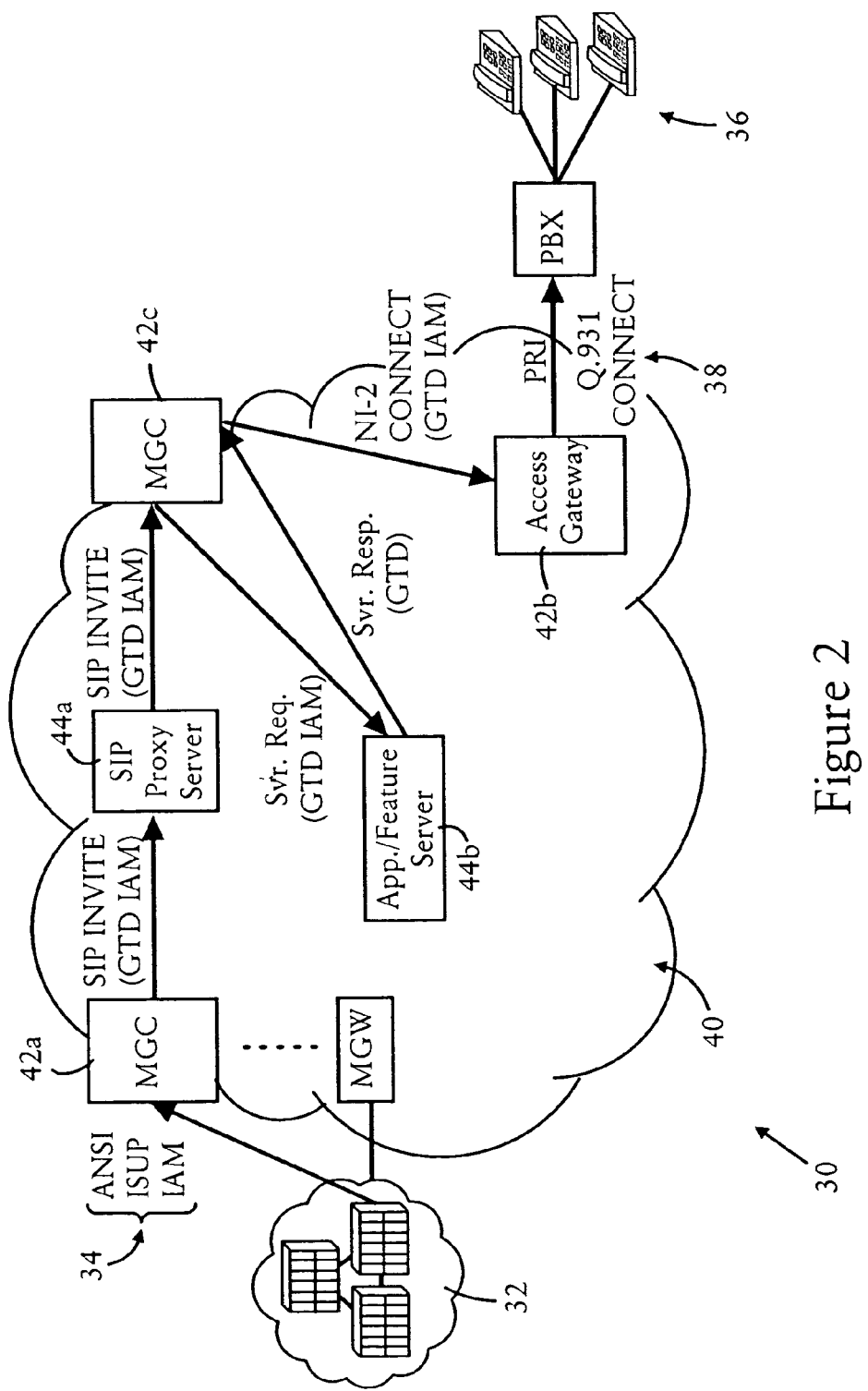
FIG. 2 is a diagram illustrating protocol independent transfer of control parameters across internetworks using generic transparency descriptor objects, according to an embodiment of the present invention.

FIG. 2 is a diagram illustrating an internetwork 30 configured for protocol independent transfer of control parameters using generic transparency descriptor (GTD) objects, according to an embodiment of the present invention. In particular, the internetwork 30 includes a source telephony network 32 (e.g., a public switched telephone network) having a source telephony protocol 34, for example ANSI ISUP. The internetwork 30 also includes a destination telephony network 36 configured for sending and receiving signaling messages according to a corresponding destination protocol 38, for example Q.931.

The signaling and media connections between the source telephony network 32 and the destination telephony network 36 are established via a packet network 40, for example an IP based network configured for transporting IP based transport messages. According to the disclosed embodiment, the IP based network 40 utilizes a known transport protocol, for example, SIP-T, where the SIP-T message includes generic transparency descriptor (GTD) objects as MIME-encoded attachments, described below. Note, however, that the IP based network 40 alternatively may be implemented as an H.323 based network configured for transport of GTD objects according to H.323 protocol.

The packet network 40 also includes network nodes 42 configured for interfacing between the telephony protocol of the associated telephony network and the transport protocol utilized by the packet network 40. For example, the packet network 40 includes a network node 42a implemented as a Media Gateway Controller (MGC) configured for controlling media connections for a Media Gateway (MGW) according to Media Gateway Control Protocol (MGCP). The network node 42a is configured for interfacing between the source telephony protocol 34 and the SIP transport protocol utilized by the packet network 40. The packet network 40 also includes a network node 42b (e.g., an access gateway), and a Media Gateway Controller (MGC) 42c.

The network node 42b is configured for interfacing between the destination telephony protocol 38 for the destination telephony network 36 and the IP network 40; the use of generic transparency descriptor objects enables the network node 42b to generate a signaling message, according to the destination telephony protocol 38, based on reception of a transport message carrying the generic transparency descriptor, regardless of the transport protocol used to transport the generic transparency descriptor. Note for example that the illustrated call processing between the source telephony network 32 and the destination telephony network 36 occurs based on the server 42c converting from the SIP-T transport protocol to the national ISDN-2 (NI-2) protocol; however, the transport of a generic transparency descriptor object specifying parameters for an Initial Address Message (IAM) enables the network node 42b to generate the IAM message according to the destination telephony protocol 38.

As described in further detail below, the generation of an IP based transport message at the source node 42a merely affects how the ISUP information is carried within a SIP transport message. In particular, the use of generic transparency descriptor objects is an alternate encoding of ISUP information to be carried in the MIME body of SIP-T, enabling the use of simpler encoding rules to provide more flexibility for handling the data within the SIP network.

Moreover, the use of generic transparency descriptor objects contains a range of granularity and compatibility mechanisms that is not found in international ISUP; hence, the ingress point 42a can transmit all data received using normalized codes that identify the data to be transported, resulting in no loss of information. In addition, the use of generic transparency descriptor objects enables exception handling in the case where the ingress network node 42a cannot identify a field value, a field tag, parameter value, parameter type, or message type.

In addition, the generic transparency descriptors are generated based on text-based encoding using a new syntax, enabling intermediate nodes 44 to interpret and process the incoming messages, for example to optimize call processing features such as call routing, or messaging services by intermediate nodes.

The generic transparency descriptors also allow a system to transport received ISUP signaling information in part: if a transport protocol (e.g., SIP, H.323, etc.) configured for transporting the GTD payload already has prescribed messages and prescribed parameters that cover the ISUP signaling information, the corresponding GTD parameters need not be carried as the payload with respect to these prescribed messages and prescribed parameters.

Figure 3:
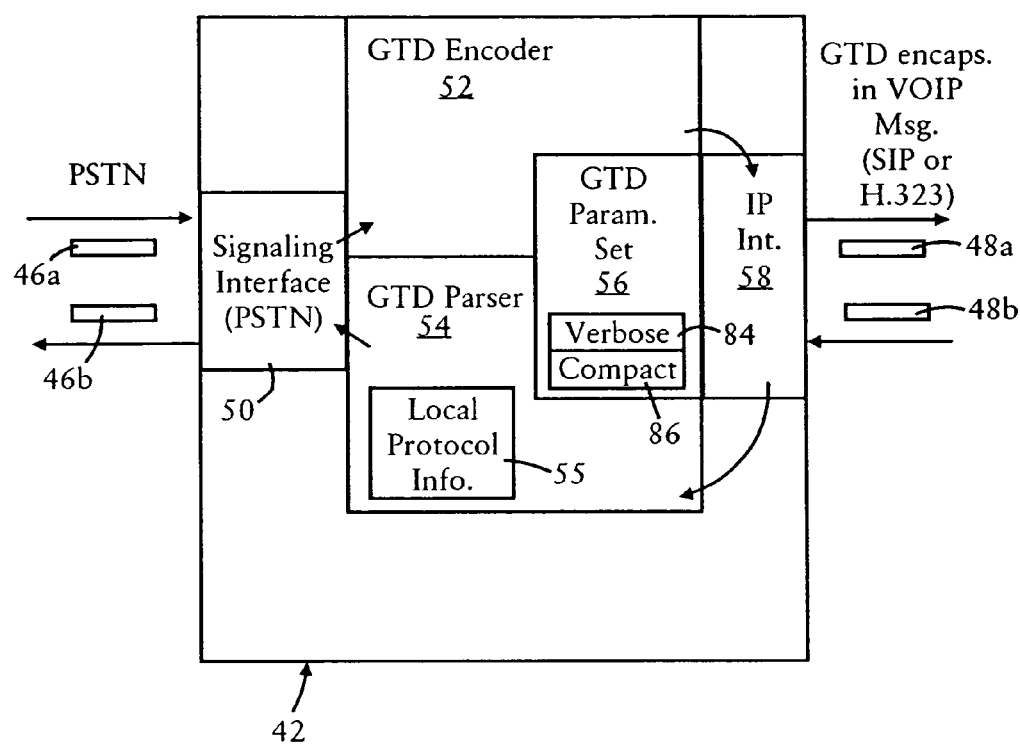
FIG. 3 is a diagram illustrating in detail the gateway nodes of FIG. 2.

FIG. 3 is a block diagram illustrating a network node 42 configured for interfacing between a telephony network (e.g., 32 or 36) and the packet network 40, according to an embodiment of the present invention. In particular, the network node 42 is configured for receiving a signaling message 46a according to the corresponding source telephony protocol 34, for example ISUP, Q.BICC, TUP, NUP, CAS, etc. The network node 42 include resources 52 for generating a generic transparency descriptor, specifying generic attributes for describing the signaling message to be transported by an IP based transport message 48a according to a prescribed IP-based protocol, for example SIP or H.323.

In particular, the network node 42 includes a signaling interface 50, a GTD encoder 52, a GTD parser 54, and an IP interface 58. The signaling interface 50 is configured for receiving a signaling message 46a from the source network 32 according to the corresponding source telephony protocol 34, and a outputting a signaling message 46b to the telephony network 32 according to the telephony protocol 34.

As described below, the GTD encoder 52 is configured for generating an IP based transport messages 48a, for example a Voice over IP (VoIP) message implemented according to SIP-T protocol or H.323 protocol, that encapsulates a generic transparency descriptor that specifies generic attributes for describing the signaling message, based on a GTD parameter set 56. The IP interface 58 is configured for outputting the VoIP message 48a onto the packet network 40 for transfer to the 111 destination network 36.

The IP interface 58 also is configured for receiving SIP-T transport messages 48b carrying generic transparency descriptor objects. The GTD parser 54 is configured for parsing the SIP-T message to recover the generic transparency descriptor objects from a TDM based PSTN network. As described below, the generic transparency descriptor includes codes and tags that enable the GTD parser 54 to determine the source telephony protocol, and message type, enabling the GTD parser 54 to selectively generate a signaling message according to the local telephony protocol based on a GTD parameter set 56 and local protocol information 55, even if the originating telephony protocol is different from the destination telephony protocol.

In particular, the generic transparency descriptor objects are text-based objects that enable the GTD encoder 52 to map the bearer independent elements specified in the signaling message to a superset of normalized parameters specified in a GTD parameter set 56. The GTD parameter set 56 is configured for storing signaling message parameters specified by multiple telephony protocols, including ANSI T1.113, ITU-T Q.761–Q.764. Moreover, the GTD parameter set includes identifier codes for identification of field tags, parameter types, message types, protocol names, and unrecognizable data elements. Examples of message identifiers in the GTD parameter set 56 and used to specify a message type according to a given telephony protocol are illustrated in the attached Appendix C, and examples of parameter names and associated GTD parameter codes in the GTD parameter set 56 are illustrated in Appendix D. Exemplary protocol name (PRN) identifiers in the GTD parameter set 56 are illustrated in the attached Appendix E.

Hence, the GTD encoder 52, upon receiving a signaling message, maps the bearer independent elements to the normalized parameters with the associated parameter values. In addition, parameters may have multiple associated parameter fields with respective field values; since these parameter fields and associated field values may have different definitions, depending on proprietary implementation within the source telephony protocol 34 relative to the destination telephony protocol 38, the mapping of all the parameters, fields, and respective values enables the GTD parser 54 at the receiving network node 42b a higher probability of being able to generate the signaling message, with all the necessary parameters and values, according to the destination signaling protocol.

In cases where the GTD encoder 52 detects data within the received signaling message 46a that is unrecognizable, the GTD encoder 52 performs selected best-fit operations in an attempt to provide the GTD parser 54 at the destination node 42b, or at any intermediate nodes 44 that may need to process the signaling message, sufficient information in order to generate the appropriate signaling message. If necessary, the GTD encoder 52 also may provide instructions for alternate execution operations in the event that the unrecognized data cannot be resolved by the GTD parser 54.

FIG. 4 is a diagram illustrating a descriptor structure hierarchy used by the network nodes 42 in generating the generic transparency descriptor based recognized and unrecognized values in the received signaling message. FIG. 5 is a diagram illustrating the IP based transport message (e.g., SIP-T) 48 generated by the GTD encoder 52. As illustrated in FIG. 5, the VoIP message 48 (implemented in the form of a SIP message) includes a SIP header 60, a Session Description Protocol (SDP) body 62 implemented as MIME body having a prescribed MIME type, and a GTD body 64 having a corresponding prescribed MIME type. The SIP-T message 48 also includes unique MIME boundary parameters per the Internet Engineering Task Force (IETF) Request for Comments (RFC) 2046[4] in order to enable and IP based resource to identify the MIME bodies 62 and 64 based on the respective specified MIME types. An example of the VoIP message 48 (in the form of a SIP message) is illustrated in the attached Appendix A, where the SDP body 62 is identified by the MIME content type header field "Content-Type" specifying a value of "application/SDP", and the GTD body 64 is identified by the MIME content type header field "Content-Type" specifying a value of "application/GTD" with associated version and character set parameters.

As illustrated in FIG. 4, and described in further detail below with respect to FIGS. 6, 7, and 8, the hierarchy of recognized or unrecognized values affects how the GTD encoder 52 and the GTD parser 54 respond to the received message 46 and 48, respectively. The top-level processing hierarchy used by the GTD parser 54 in identifying the GTD body 64 (and used by the GTD encoder 52 in generating the GTD body 64) is based on the corresponding prescribed MIME Content-Type header field 70 specifying the prescribed value of "application/GTD". The next highest level in the processing hierarchy involves identifying the protocol name (PRN) 72, where the GTD encoder 52 specifies the protocol name of the source telephony protocol 34 relative to the prescribed set of source telephony protocol types specified within the GTD parameter set 56. The protocol name 72 may have associated field tag/value pairs 74a that specify specific variations of the generalized protocol; as illustrated in the attached Appendix A, the protocol name PRN specifies a protocol "t1113" that refers to ANSI T1.113, United States variant ("c=US*"), vendor variant ("o=itsp1"), according to the year 1995 variant ("prv=1995"). The protocol name (PRN) syntax is illustrated in the attached Appendix E. Hence, the protocol name 72 precisely identifies the specific protocol by its variation, enabling the GTD parser 54 at the receiving end to identify the protocol and its variation.

Following identification of the protocol name 72, the next stage of the processing hierarchy in FIG. 4 involves whether not the message type 76 is recognized by the GTD encoder 52. Exemplary message types, illustrated in the attached Appendix C, provide more precise information regarding message handling and the type of message. Note that the Appendix C specifies a GTD code "UNR" for unrecognized messages, enabling the GTD encoder 52 to generate the VoIP message 48 with the GTD body 64, even though the message is unrecognized by the GTD encoder 52; as described below, in this case the GTD encoder 52 would also include the unrecognized message encapsulated within the GTD body 64, along with the unrecognized message code "UNR", providing the GTD parser 54 at the receiving end the opportunity to recognize the encapsulated signaling message, based on the UNR message code specifying that the data includes the encapsulated signaling message as an unrecognized message.

The next stage of the processing hierarchy in FIG. 4 involves determining if unrecognized parameter types 78 are detected that are associated with a recognized message. In particular, a proprietary variation of a recognized message type may involve unrecognized parameter types; in such cases, the GTD encoder 52 would identify unrecognized parameter types 78 using a parameter compatibility information code "PCI" indicating the presence of an unrecognized parameter tag. The GTD encoder 52 would also encapsulate the unrecognized parameter, attempt to supply a best fit parameter, and supply a contingent response instruction in the event that the GTD parser 54 at the receiving end is unable to recognize the parameter 78.

The next stage of the processing hierarchy in FIG. 4 involves determining if unrecognized field tags 80 are detected that are associated with a recognized parameter 78, or unrecognized field values 82 associated with recognized field tags 80, illustrated in FIG. 6 as field tag value pairs 74. If the GTD encoder 52 is unable to recognize a field tag 80, the GTD encoder 52 utilizes an unknown field compatibility information code "UFC", encapsulates the unrecognized field tag with its corresponding value, supplies a best fit field tag if available, and a contingent response instruction for use in the GTD parser 54 at the receiving end is unable to interpret the unrecognized field tag 80. If the GTD encoder 52 is unable to recognize a field value 82 (e.g., a proprietary address utilized by the local PSTN 32) of a recognized field tag 80, the GTD encoder 52 utilizes a known field compatibility information code "FDC", encapsulates the unrecognized field value, and supplies a contingent response instruction for use if the GTD parser 54 at the receiving end is unable to determine an acceptable value for the field value.

FIG. 6 is a diagram illustrating the GTD body 64 generated by the GTD encoder 52, based on a recognized message type 76 of a known protocol 72, recognized parameter types 78, and recognized field tags 80. As illustrated in FIG. 6 and in Appendix A, the GTD body 64 includes the content type header 70 that identifies the MIME type as a GTD object, a protocol name (PRN) code 72 including the associated field tag/value pairs 74a to precisely identify the protocol, and the message identifier 76 to identify the message type according to the source telephony protocol specified by the PRN code 72. According to the disclosed embodiment, the content type header 70, the protocol name 72, and the message name 76 are required fields for the GTD body 64; the parameter information 78, and associated field tags 80 and field values 82 are optional, depending on the particular message type specified by the message name 76.

Hence, the GTD encoder 52 provides successively detailed normalization of information from the received signaling message 46, based on the level of detail within received signaling message, and based on the hierarchy illustrated in FIG. 4 in the GTD encoder 52 being able to recognize the message type, parameter type, field tag, and field value for generation of respective normalized tags and values. At any stage that the GTD encoder 52 is unable to recognize a message type, parameter type, field tag, or field value, the GTD encoder 52 may attempt to provide a best fit approximation that accompanies the encapsulated information, plus instructions for the GTD parser 54 at the destination node to execute as a contingent response if the GTD parser 54 is unable to recognize the encapsulated information. Possible actions include: release call, send notification, pass on the message or parameter (intermediate exchange only) or discard message or parameter.

An additional feature of the GTD encoder 52 is that it may be configured for generating the GTD body 64 according to either a default text based mode, also referred to as a verbose mode, or a compact mode for minimizing bandwidth in networks having limited bandwidth capabilities. Hence, the GTD encoder 52 can be configured for normalized in the signaling parameters according to the verbose mode 84, or the compact mode 86. Examples of GTD objects for an Initial Address Message (IAM) and an Address Complete Message (ACM) according to verbose mode 84 and compact mode 86 are illustrated in the attached Appendix B. An additional binary mode may be implemented in networks where bandwidth preservation is more critical, where the binary mode may utilize one-fourth the size of a verbose sized-message, or one-half the size of a compact message.

Figure 7A:
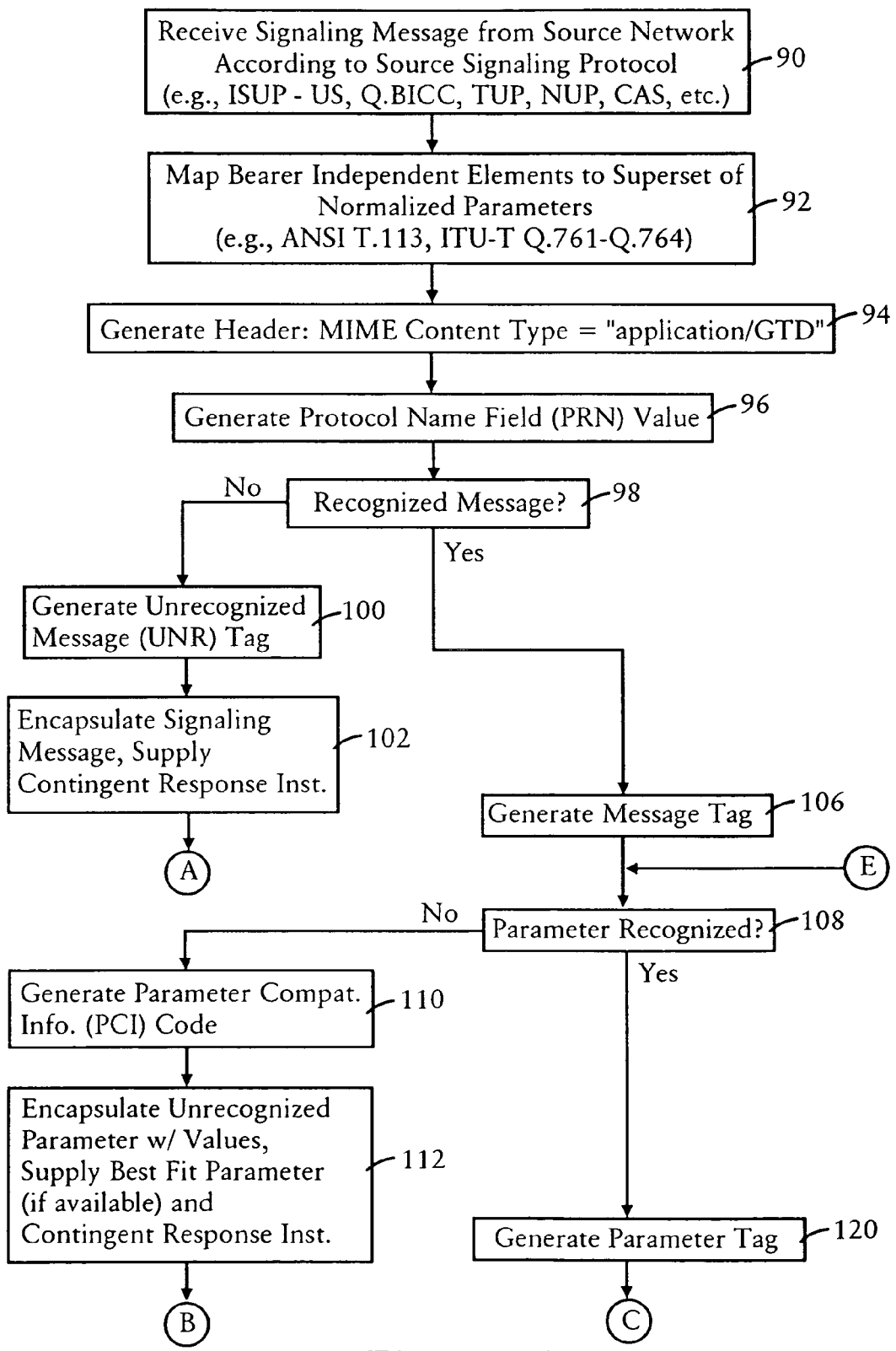
FIGS. 7A and 7B are diagrams summarizing the method of generating the IP-based transport message based on the received signaling message, according to an embodiment of the present invention.
Figure 7B:
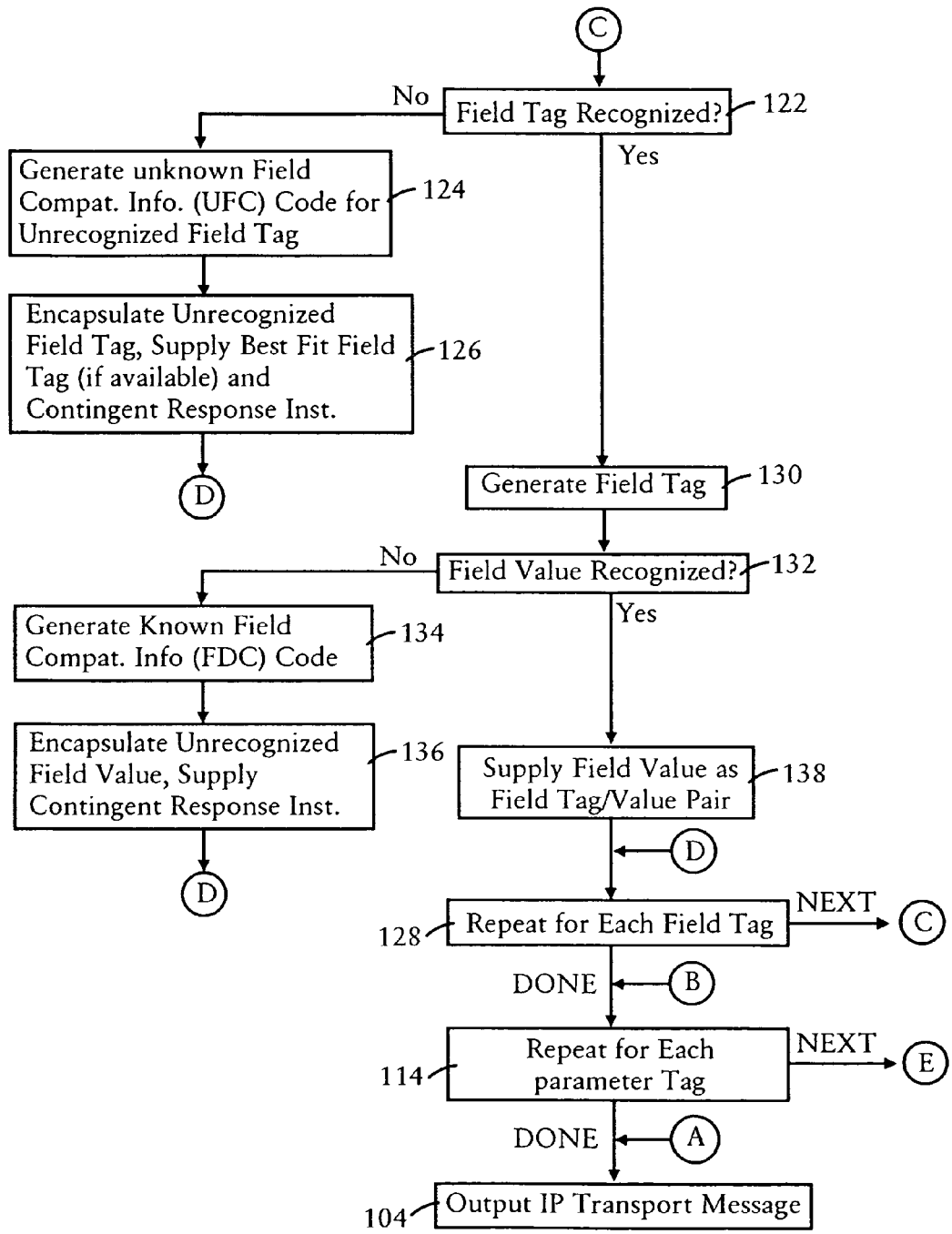
Figure 8A:
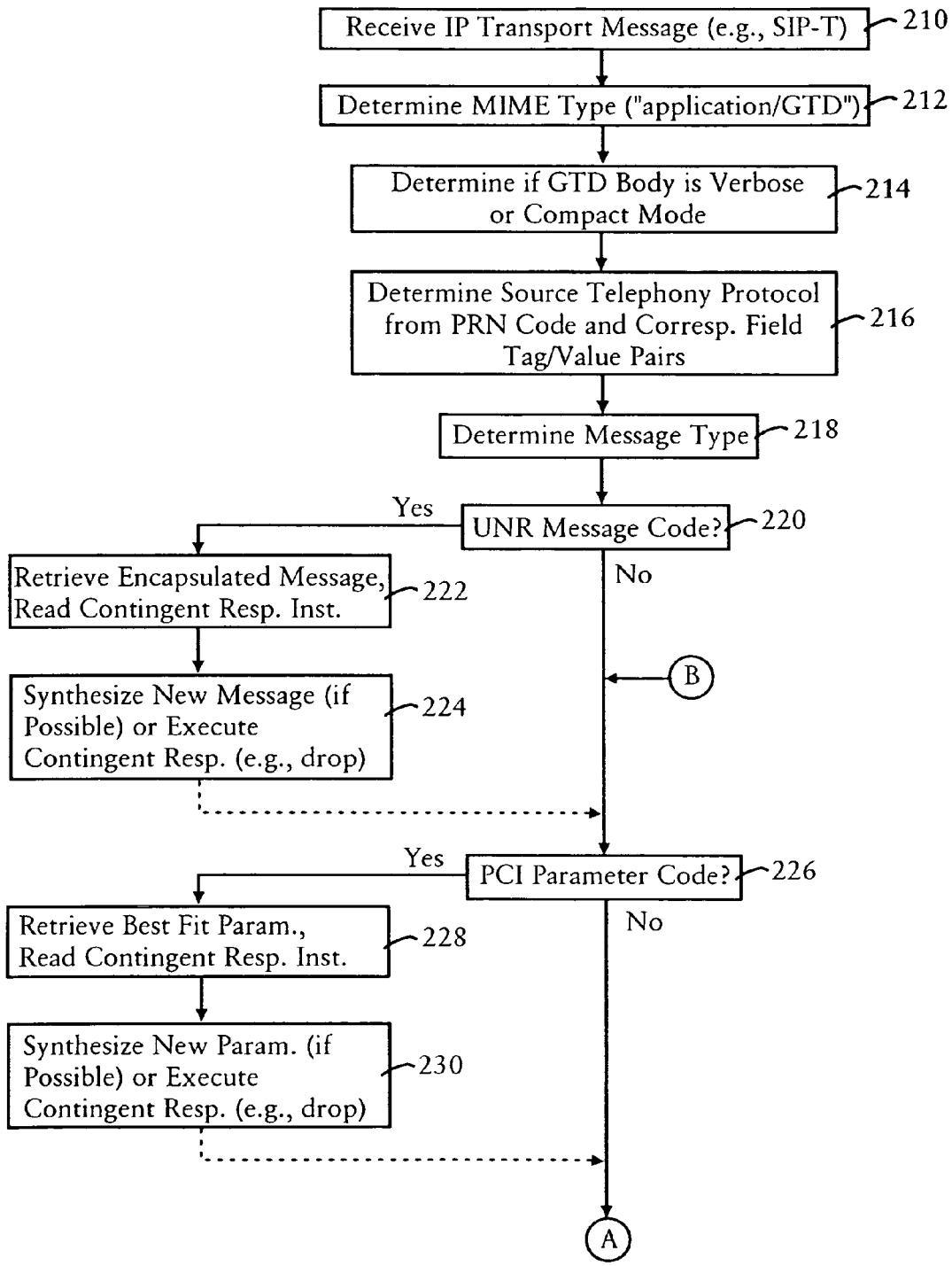
FIGS. 8A and 8B are diagrams summarizing the method of generating a signaling message, according to a destination protocol, based on receiving the IP-based transport message, according to an embodiment of the present invention.
Figure 8B:
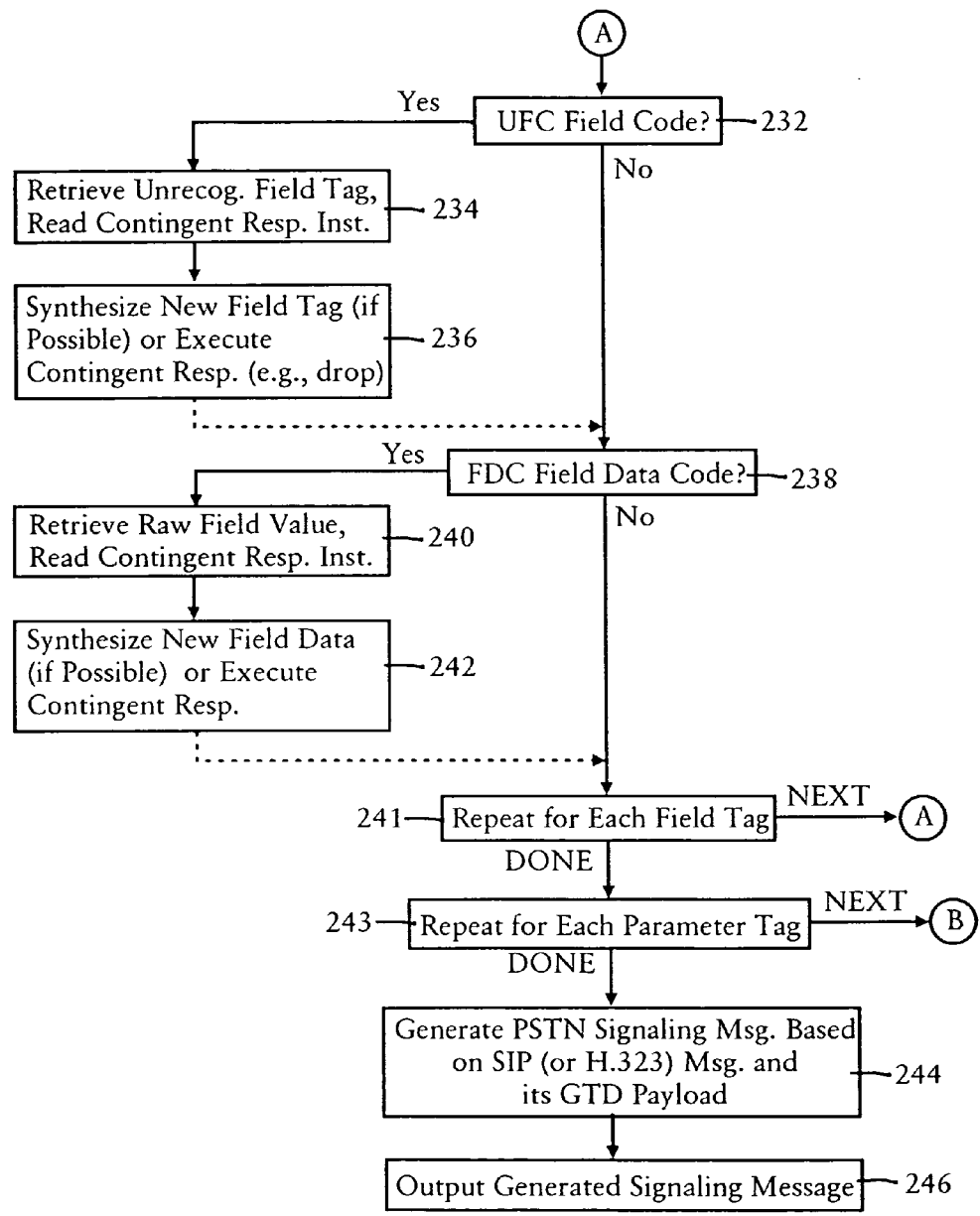

FIGS. 7A and 7B are diagrams summarizing the method of generating the IP based transport message by the GTD encoder 52 at the ingress node 42a based on the received signaling message 46a, according to an embodiment of the present invention. FIGS. 8A and 8B are diagrams summarizing the method by the GTD parser 54 at the receiving network node 42b of generating a signaling message, according to the destination telephony protocol, based on receiving the IP based transport message, according to an embodiment of the present invention. The steps described herein with respect to FIGS. 7 and 8 can be implemented as executable code stored on a computer readable medium (e.g., a hard disk drive, a floppy drive, a random access memory, a read only memory, an EPROM, a compact disk, etc.).

The method of generating the IP based transport message 48 begins in step 90, where the signaling interface 50 of the ingress node 42a receives the signaling message 46a from the source telephony network 32 according to the source telephony signaling protocol 34. As described above, the source telephony protocol 34 may be any one of a number of prescribed telephony protocols, including ISUP, Q.BICC, TUP, NUP, CAS, etc. The GTD encoder 52 parses the received signaling message 46a and maps the bearer independent elements of the received signaling message 46a to the superset of normalized parameters from the GTD parameter set 56 in step 92.

The GTD encoder 52 generates in step 94 the MIME header by specifying in the MIME content type field a prescribed MIME type of "application/GTD". The GTD encoder 52 then generates in step 96 the value for the protocol name field 72 as illustrated in Appendix E, that specifies the source telephony protocol relative to the prescribed set of source telephony protocol types. The GTD encoder 52 also provides a unique transaction identifier (TID) within the message 48a, enabling call tracing tools external to the network 40 to associate any arriving event with the associated generated events.

The GTD encoder 52 then determines in step 98 whether the message type in the received signaling message is recognized from the GTD parameter set 56. If in step 98 the GTD encoder 52 does not recognize the message type, the GTD encoder 52 generates in step 100 an unrecognized message tag (UNR), and inserts the unrecognized message tag (UNR) into the message name field 76 of the GTD body 64. The GTD encoder 52 also encapsulates the unrecognized signaling message in step 102, and supplies a contingent response instruction for the GTD parser 54 at the egress node 42b in the event that the egress node 42b is unable to recognize the signaling message.

The GTD encoder 52 then completes the IP based SIP-T transport message 48a, as illustrated in FIG. 5, and outputs the SIP-T message in step 104, illustrated in FIG. 7B.

If in step 98 the message type in the received signaling message 46a is recognized by the GTD encoder 52, the GTD encoder 52 generates in step 106 the corresponding message tag 76, for example as illustrated in the attached Appendix C, and determines in step 108 whether any of the parameters associated with the message tag are not recognized.

If in step 108 the recognized signaling message 46a includes unrecognized parameters, the GTD encoder 52 generates in step 110 a parameter compatibility information (PCI) code as a parameter name (see attached Appendix D), and encapsulates in step 112 the unrecognized parameter with the associated parameter values. The GTD encoder 52 also supplies a best fit parameter, if available, and provides a contingent response instruction that specifies a contingent response for the GTD parser 54 at the egress node 42b in the event the GTD parser 54 is unable to recognize the encapsulated unrecognized parameter.

The process is then repeated in step 114 for each parameter tag, returning to step 108 for parameter recognition of any subsequent parameter.

If in step 108 the parameter is recognized, the corresponding normalized parameter tag is generated in step 120, for example from the list of GTD parameter codes as illustrated in the attached Appendix D.

Once the parameter tag is generated in step 120, the GTD encoder 52 determines in step 122 whether each of the field tags 80 associated with the parameter 78 are recognized, as illustrated in FIG. 7B. If a field tag is not recognized, the GTD encoder 52 generates in step 124 an unknown field compatibility information (UFC) code for the unrecognized field tag, and encapsulates in step 126 the unrecognized field tag. The GTD encoder 52 also supplies a best fit field tag, if available, and a contingent response instruction for use by the egress node 42*b* if the encapsulated field tag is not recognized by the GTD parser 54 at the egress node 42*b*. The process is repeated in step 128 for each field tag, repeating step 122 for each field tag associated with the recognized parameter.

If in step 122 the field tag is recognized, the prescribed field tag as specified according to the GTD parameter set 56 is generated in step 130. Examples of generated field tags are illustrated for selected parameters (e.g., GCI, TID, NOC, etc.) in the attached Appendix A.

The GTD encoder 52 then checks in step 132 if the corresponding field value is recognized. If the field value is not recognized by the GTD encoder 52 (e.g., in the case of a proprietary address value), the GTD encoder 52 generates in step 134 a known field compatibility information (FDC) code in step 134, and encapsulates in step 136 the unrecognized field value, and supplies a contingent response instruction for the GTD parser 54. The contingent response instruction enables the GTD parser 54 at the egress node 42*b* to execute an operation if the field value is unrecognized, for example to release the call if not understood, use a default value without sending notification, use the default value while sending notification, attempt to find an alternative for the value, etc. The process is then repeated in step 128 for each value in step 132.

If in step 132 the field value is recognized, the GTD encoder 52 supplies the field value in step 138 as a field tag/value pair. The process is then repeated for each field tag for the identified parameter.

FIGS. 8A and 8B are diagrams summarizing the method of generating a signaling message for a destination telephony network having a corresponding destination telephony protocol, based an IP based transport message 48*b* having a generic transparency descriptor specifying generic attributes for the signaling message generated according to a source telephony protocol, according to an embodiment of the present invention.

The method of FIGS. 8A and 8B will be described with respect to the egress node 42*b* receiving the VoIP message 48*b* from the packet network 40.

The method begins in step 210, where the IP interface 58 receives the IP based SIP-T transport message 48*b* from the packet network 40. The IP-based SIP-T transport message, illustrated in FIG. 5, includes a SIP header 60, a MIME encoded STP header 62, and a MIME encoded GTD body 64. The IP interface 58 and/or the GTD parser 54 detect in step 212 the MIME encoded GTD body 64 based on the content type header 70 specifying a media content type of "application/GTD".

The GTD parser 54 identifies in step 214 whether the GTD body 64 is implemented according to a text based protocol that specifies the generic attributes as string literals or a compact protocol that specifies the generic attributes without the string literals, based on a determined absence of the string literals.

The GTD parser 54 then determines in step 216 the source telephony protocol from the protocol name (PRN) field 72 and the associated field tag/value pairs 74*a* associated with the protocol name. As described above with respect to step 96 in FIG. 7A, and as illustrated in the attached Appendix A, the protocol name field 72 and the associated field tag/value pairs 74*a* include sufficient information to enable the GTD parser 54 to precisely identify the protocol, and the associated variants, of the source telephony protocol.

Hence, if the source telephony protocol 34 and the destination telephony 38 are identical protocols with the same variants for a given country, vendor, and service provider, the GTD parser 54 may be able to recreate the original signaling message, even if the GTD encoder 52 at the ingress network node 42*a* may have detected unrecognized messages 76, parameters 78, field tags 80, or field values 82, based on the localized protocol information 55. If the source telephony protocol 34 is not identical to the destination telephony protocol 38, the source and destination telephony protocols still may have sufficient similarities to enable the GTD parser 54 to recreate the necessary signaling message data or generate a best fit, based on localized protocol information 55. If the GTD parser 54 is unable to determine the appropriate data to be generated based on the unrecognized information, the GTD parser 54 still may either utilize the supplied data in "raw" form, or drop the message, depending on local logic or any instructions that specify a contingent response.

The GTD parser 54 then parses in step 218 the message type field 76 in order to determine the message type 76. If the GTD parser 54 determines in step 220 that the message identifier specifies an unrecognized message code UNR, the GTD parser 54 retrieves the encapsulated signaling message in step 222, and selectively generates in step 224 a new signaling message based on the encapsulated signaling message and local protocol information 55, or alternately drops the signaling message, depending on problem resolution logic within the GTD parser 54. If a new signaling message can be generated, the GTD parser 54 outputs the signaling message in step 246.

If in step 220 the message identifier specifies a prescribed message type, the GTD parser 54 parses the corresponding parameters to determine in step 226 if there are any parameter capability information (PCI) codes indicating an unrecognized parameter relative to the recognized message type.

If in step 226 the PCI code is detected, the GTD parser 54 retrieves in step 228 the best fit parameter from the GTD body 64, and the contingent response instruction. The parser 54 either selectively generates in step 230 the new parameter and the corresponding parameter values based on the best fit parameters, or executes the contingent response based on whether the unrecognized parameter can be recognized relative to the destination telephony protocol.

If in step 226 there is no PCI code that specifies an unrecognized parameter, the GTD parser 54 determines in step 232 of FIG. 8B whether there is an unknown field capability information (UFC) code that specifies an unrecognized field tag 80. If the GTD parser 54 detects a UFC code, the GTD parser 54 parses in step 234 the supplied unrecognized field value and the contingent response instruction, and selectively either generates a new field value in step 236 for the prescribed parameter code according to the destination telephony protocol, based on the supplied unrecognized field value and the local protocol information 55, or executes the contingent response if the GTD parser 54 is unable to recognize the supplied field value relative to the destination telephony protocol.

If in step 232 there are no UFC codes, the GTD parser 54 checks in step 238 for any known field information parameter codes (FDC) specifying unrecognized field values 82. If any FTC codes are detected, the GTD parser 54 parses in step 240 the encapsulated unrecognized field value and the contingent response instruction, and selectively executes in step 242 either the selective generation of a new field value according to the destination telephony protocol based on the supplied unrecognized field value and the local protocol information 55; if the GTD parser 54 is unable to recognize the unrecognized field value relative to the destination telephony protocol, the GTD parser 54 selectively executes the contingent response specified in the instruction, according to local logic (e.g., whether the logic is configured to respond to the instruction). The process is repeated in step 241 for each field tag, and in step 243 for each parameter tag.

Based on the foregoing, if the GTD parser 54 has sufficient information, the GTD parser 54 completes the generation of the signaling packet 46b according to the destination telephony protocol in step 244, and outputs the signaling message in step 246 according to the destination telephony protocol.

According to the disclosed embodiment, telephony signaling messages generated according to proprietary telephony protocols can be normalized based on generic transparency descriptor objects to generate a transport message, carrying the normalized GTD objects, via an IP network, enabling a network node on the IP network to generate a new signaling message according to a proprietary destination protocol, without the need for detailed mapping parameters regarding the original telephony protocol. In addition, the GTD parameter set can be periodically updated using known inheritance techniques, enabling new and updated proprietary protocols to be transparently supported across the IP network. Finally, the use of GTD objects to describe the signaling messages enables intermediate nodes within the IP network to interpret the signaling messages for intermediate processing.

Although the disclosed embodiment has described the use of GTD for existing ISUP protocols, the disclosed embodiment also may be applicable to other control-related information (as distinguished from to media information), for example ISDN (Q.931 and Q.SIG), TUP (Q.721) and other protocols such as NUP.

Note that GTD also is suitable for use as a generic internal representation of various ISUP information within a network element such as a call agent; GTD also may be applied in any manner requiring a protocol-independent transfer of control information between resources utilizing different protocols.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in a network node configured for interfacing between a source network having a source telephony protocol and a packet network configured for sending and receiving data according to Internet Protocol, the method comprising:
   receiving a signaling message from the source network according to the source telephony protocol, the signaling message specifying a signaling operation to be executed according to the source telephony protocol;
   generating an IP-based transport message having a generic transparency descriptor specifying generic attributes for describing the signaling message, the generic attributes including a protocol name that specifies the source telephony protocol relative to a prescribed set of source telephony protocol types, and a message identifier that specifies a message type according to the source telephony protocol; and
   outputting the IP-based transport message, having the generic transparency descriptor, to a node via the packet network.

2. The method of claim 1, wherein the generating step includes generating the generic transparency descriptor as a prescribed MIME type, the outputting step including outputting the IP-based transport message according to one of Session Initiation Protocol (SIP) and H.323 protocol.

3. The method of claim 2, wherein the generating step further includes specifying the generic attributes according to one of a text-based protocol that specifies the generic attributes as string literals, and a compact protocol that specifies the generic attributes without the string literals.

4. The method of claim 1, wherein the generating step includes:
   mapping bearer independent elements specified in the signaling message to a superset of normalized parameters for signaling message parameters among the prescribed set of source telephony protocol types; and
   generating the generic attributes based on the mapped bearer independent elements.

5. The method of claim 4, wherein the superset of normalized parameters includes the signaling message parameters specified by ANSI T1.113 and ITU-T Q.761–Q.764 specifications implemented using an IP infrastructure.

6. The method of claim 1, wherein the generating step includes:
   determining an unrecognized field value associated with a recognized field tag in the signaling message, the recognized field tag associated with a recognized parameter of a recognized message type; and
   inserting, within the generic attributes, a known field compatability information parameter code that specifies the unrecognized field value.

7. The method of claim 6, wherein the inserting step includes adding an instruction for the node that specifies a contingent response to the unrecognized field value based on the node being unable to recognize the unrecognized field value.

8. The method of claim 1, wherein the generating step includes:
   determining an unrecognized field tag in the signaling message, the unrecognized field tag associated with a recognized parameter of a recognized message type;
   determining a presence of a best-fit field tag that approximates the unrecognized field tag; and
   inserting, within the generic attributes, an unknown field compatability information parameter code that specifies the unrecognized field tag and a corresponding field code specified within the signaling message, the generating step including selectively inserting the best-fit field tag based on the determined presence thereof.

9. The method of claim 8, wherein the inserting step includes adding an instruction for the node that specifies a contingent response to the unrecognized field tag based on the node being unable to recognize the unrecognized field tag.

10. The method of claim 1, wherein the generating step includes:
   determining an unrecognized parameter in the signaling message, the unrecognized parameter associated with a recognized message type;
   determining a presence of a best-fit parameter that approximates the unrecognized parameter; and inserting, within the generic attributes, a parameter comparability information code that specifies the unrecognized parameter and associated parameter values specified within the unrecognized parameter, the generating step including selectively inserting the best-fit parameter based on the determined presence thereof.

11. The method of claim 10, wherein the inserting step includes adding an instruction for the node that specifies a contingent response to the unrecognized parameter based on the node being unable to recognize the unrecognized parameter.

12. The method of claim 1, wherein the generating step includes:
 determining the signaling message to be an unrecognized message;
 encapsulating the signaling message within the IP-based transport message; and
 specifying, as the message identifier, an unrecognized message code that specifies the encapsulated signaling message.

13. The method of claim 12, wherein the generating step further includes adding an instruction for the node that specifies a contingent response to the encapsulated signaling message based on the node being unable to recognize the encapsulated signaling message.

14. A method in a network node configured for interfacing between a packet network configured for sending and receiving data according to Internet Protocol and a destination network having a destination telephony protocol, the method comprising:
 receiving an IP-based transport message having a generic transparency descriptor specifying generic attributes for describing a signaling message generated by a source network according to a source telephony protocol, the generic attributes including a protocol name and a message identifier;
 determining the source telephony protocol relative to a prescribed set of source telephony protocol types based on parsing the protocol name, and a message type for the signaling message according to the source telephony protocol based on parsing the message identifier;
 selectively generating the signaling message according to the destination telephony protocol based on the source telephony protocol and the determined message type; and
 selectively outputting a new signaling message, onto the destination network, representing the signaling message according to the destination telephony protocol.

15. The method of claim 14, wherein the IP-based transport message includes a MIME body carrying the generic transparency descriptor, the method further comprising retrieving the generic transparency descriptor from the MIME body based on identifying the MIME body as a prescribed MIME type configured for carrying the generic transparency descriptor, the receiving step including receiving the IP-based transport message according to one of Session Initiation Protocol (SIP) and H.323 protocol.

16. The method of claim 15, further comprising identifying the generic transparency descriptor as implemented according to one of a text-based protocol that specifies the generic attributes as string literals, and a compact protocol that specifies the generic attributes without the string literals, based on a determined absence of a prescribed one of the string literals.

17. The method of claim 14, wherein the determining step includes identifying the source telephony protocol and the message type based on comparing the protocol name and the message identifier to a prescribed superset of normalized parameters for signaling message parameters among the prescribed set of source protocol types.

18. The method of claim 17, wherein the superset of normalized parameters includes the signaling message parameters specified by ANSI T1.113 and ITU-T Q.761–Q.764 specifications implemented using an IP infrastructure.

19. The method of claim 14, wherein the selectively generating step includes:
 detecting within the generic transparency descriptor a known field information parameter code that specifies a prescribed parameter code according to the source telephony protocol and a supplied unrecognized field value, and
 selectively generating a new field value for the prescribed parameter code according to the destination telephony protocol, based on the known field information parameter code and the supplied unrecognized field value.

20. The method of claim 19, further comprising:
 detecting in the generic transparency descriptor an instruction that specifies a contingent response to the unrecognized field value based on a determined inability to recognize the unrecognized field value; and
 selectively executing the contingent response based on the determined inability to recognize the unrecognized field value relative to the destination telephony protocol.

21. The method of claim 14, wherein the selectively generating step includes:
 detecting within the generic transparency descriptor an unknown field compatability information parameter code that specifies an unrecognized field tag and a corresponding field code according to the source telephony protocol, and a supplied best-fit field tag, and
 selectively generating a new field tag and a corresponding new field code according to the destination telephony protocol, based on the best-fit field tag.

22. The method of claim 19, further comprising:
 detecting in the generic transparency descriptor an instruction that specifies a contingent response to the unrecognized field tag based on a determined inability to recognize the unrecognized field tag; and
 selectively executing the contingent response based on the determined inability to recognize the unrecognized field tag relative to the destination telephony protocol.

23. The method of claim 14, wherein the selectively generating step includes:
 detecting within the generic transparency descriptor a parameter compatability code that specifies an unrecognized parameter relative to a recognized message type, and associated parameter values specified according to the source telephony protocol, and a supplied best-fit parameter, and
 selectively generating a new parameter and corresponding parameter values according to the destination telephony protocol, based on the best-fit parameter.

24. The method of claim 23, further comprising:
 detecting in the generic transparency descriptor an instruction that specifies a contingent response to the unrecognized parameter based on a determined inability to recognize the unrecognized parameter; and
 selectively executing the contingent response based on the determined inability to recognize the unrecognized parameter relative to the destination telephony protocol.

25. The method of claim 14, wherein:
the IP-based transport message includes the signaling message encapsulated within the generic transparency descriptor;
the determining step includes determining the message identifier to specify, as the message type, an unrecognized message based on the message identifier specifying an unrecognized message code; and
the selectively generating step includes selectively generating the new signaling message based on the signaling message encapsulated within the generic transparency descriptor.

26. The method of claim 25, further comprising:
detecting in the generic transparency descriptor an instruction that specifies a contingent response to the unrecognized message based on a determined inability to recognize the unrecognized message; and
selectively executing the contingent response based on the determined inability to recognize the unrecognized message relative to the destination telephony protocol.

27. A network node configured for interfacing between a source network having a source telephony protocol and a packet network configured for sending and receiving data according to Internet Protocol, the network node comprising:
a signaling interface configured for receiving a signaling message from the source network according to the source telephony protocol, the signaling message specifying a signaling operation to be executed according to the source telephony protocol;
an encoder configured for generating an IP-based transport message having a generic transparency descriptor specifying generic attributes for describing the signaling message, the generic attributes including a protocol name that specifies the source telephony protocol relative to a prescribed set of source telephony protocol types, and a message identifier that specifies a message type according to the source telephony protocol; and
an IP interface configured for outputting the IP-based transport message, having the generic transparency descriptor, to a node via the packet network.

28. The network node of claim 27, wherein the encoder is configured for generating the generic transparency descriptor as a prescribed MIME type, the IP interface configured for outputting the IP-based transport message according to one of Session Initiation Protocol (SIP) and H.323 protocol.

29. The network node of claim 28, wherein the encoder is configured for specifying the generic attributes according to one of a text-based protocol that specifies the generic attributes as string literals, and a compact protocol that specifies the generic attributes without the string literals.

30. The network node of claim 27, wherein the encoder is configured for:
mapping bearer independent elements specified in the signaling message to a superset of normalized parameters for signaling message parameters among the prescribed set of source telephony protocol types; and
generating the generic attributes based on the mapped bearer independent elements.

31. The network node of claim 30, wherein the superset of normalized parameters includes the signaling message parameters specified by ANSI T1.113 and ITU-T Q.761–Q.764 specifications implemented using an IP infrastructure.

32. The network node of claim 27, wherein the encoder is configured for:
determining an unrecognized field value associated with a recognized field tag in the signaling message, the recognized field tag associated with a recognized parameter of a recognized message type; and
inserting, within the generic attributes, a known field compatability information parameter code that specifies the unrecognized field value.

33. The network node of claim 32, wherein the encoder is further configured for adding an instruction for the node that specifies a contingent response to the unrecognized field value based on the node being unable to recognize the unrecognized field value.

34. The network node of claim 27, wherein the encoder is configured for:
determining an unrecognized field tag in the signaling message, the unrecognized field tag associated with a recognized parameter of a recognized message type;
determining a presence of a best-fit field tag that approximates the unrecognized field tag; and
inserting, within the generic attributes, an unknown field compatability information parameter code that specifies the unrecognized field tag and a corresponding field code specified within the signaling message, the generating step including selectively inserting the best-fit field tag based on the determined presence thereof.

35. The network node of claim 34, wherein the encoder is configured for adding an instruction for the node that specifies a contingent response to the unrecognized field tag based on the node being unable to recognize the unrecognized field tag.

36. The network node of claim 27, wherein the encoder is configured for:
determining an unrecognized parameter in the signaling message, the unrecognized parameter associated with a recognized message type;
determining a presence of a best-fit parameter that approximates the unrecognized parameter; and
inserting, within the generic attributes, a parameter compatability information code that specifies the unrecognized parameter and associated parameter values specified within the unrecognized parameter, the generating step including selectively inserting the best-fit parameter based on the determined presence thereof.

37. The network node of claim 36, wherein the encoder is configured for adding an instruction for the node that specifies a contingent response to the unrecognized parameter based on the node being unable to recognize the unrecognized parameter.

38. The network node of claim 27, wherein the encoder is configured for:
determining the signaling message to be an unrecognized message;
encapsulating the signaling message within the IP-based transport message; and
specifying, as the message identifier, an unrecognized message code that specifies the encapsulated signaling message.

39. The network node of claim 38, wherein the encoder is configured for adding an instruction for the node that specifies a contingent response to the encapsulated signaling message based on the node being unable to recognize the encapsulated signaling message.

40. A network node configured for interfacing between a packet network configured for sending and receiving data according to Internet Protocol and a destination network having a destination telephony protocol, the network node comprising:

an IP interface configured for receiving an IP-based transport message having a generic transparency descriptor specifying generic attributes for describing a signaling message generated by a source network according to a source telephony protocol, the generic attributes including a protocol name and a message identifier;

a parser configured for determining the source telephony protocol relative to a prescribed set of source telephony protocol types based on parsing the protocol name, and a message type for the signaling message according to the source telephony protocol based on parsing the message identifier, the parser selectively generating the signaling message according to the destination telephony protocol based on the source telephony protocol and the determined message type; and a signaling interface configured for selectively outputting a new signaling message, onto the destination network, representing the signaling message according to the destination telephony protocol.

41. The network node of claim 40, wherein the IP-based transport message includes a MIME body carrying the generic transparency descriptor, the parser configured for retrieving the generic transparency descriptor from the MIME body based on identifying the MIME body as a prescribed MIME type configured for carrying the generic transparency descriptor, the IP interface configured for receiving the IP-based transport message according to one of Session Initiation Protocol (SIP) and H.323 protocol.

42. The network node of claim 41, wherein the parser is configured for identifying the generic transparency descriptor as implemented according to one of a text-based protocol that specifies the generic attributes as string literals, and a compact protocol that specifies the generic attributes without the string literals, based on a determined absence of a prescribed one of the string literals.

43. The network node of claim 40, wherein the parser is configured for identifying the source telephony protocol and the message type based on comparing the protocol name and the message identifier to a prescribed superset of normalized parameters for signaling message parameters among the prescribed set of source protocol types.

44. The network node of claim 43, wherein the superset of normalized parameters includes the signaling message parameters specified by ANSI T1.113 and ITU-T Q.761–Q.764 specifications implemented using an IP infrastructure.

45. The network node of claim 40, wherein the parser is configured for:

detecting within the generic transparency descriptor a known field information parameter code that specifies a prescribed parameter code according to the source telephony protocol and a supplied unrecognized field value, and selectively generating a new field value for the prescribed parameter code according to the destination telephony protocol, based on the known field information parameter code and the supplied unrecognized field value.

46. The network node of claim 45, wherein the parser is configured for:

detecting in the generic transparency descriptor an instruction that specifies a contingent response to the unrecognized field value based on a determined inability to recognize the unrecognized field value; and selectively executing the contingent response based on the determined inability to recognize the unrecognized field value relative to the destination telephony protocol.

47. The network node of claim 40, wherein the parser is configured for:

detecting within the generic transparency descriptor an unknown field compatability information parameter code that specifies an unrecognized field tag and a corresponding field code according to the source telephony protocol, and a supplied best-fit field tag, and selectively generating a new field tag and a corresponding new field code according to the destination telephony protocol, based on the best-fit field tag.

48. The network node of claim 45, wherein the parser is configured for:

detecting in the generic transparency descriptor an instruction that specifies a contingent response to the unrecognized field tag based on a determined inability to recognize the unrecognized field tag; and selectively executing the contingent response based on the determined inability to recognize the unrecognized field tag relative to the destination telephony protocol.

49. The network node of claim 40, wherein the parser is configured for:

detecting within the generic transparency descriptor a parameter compatability code that specifies an unrecognized parameter relative to a recognized message type, and associated parameter values specified according to the source telephony protocol, and a supplied best-fit parameter, and selectively generating a new parameter and corresponding parameter values according to the destination telephony protocol, based on the best-fit parameter.

50. The network node of claim 49, wherein the parser is configured for:

detecting in the generic transparency descriptor an instruction that specifies a contingent response to the unrecognized parameter based on a determined inability to recognize the unrecognized parameter; and selectively executing the contingent response based on the determined inability to recognize the unrecognized parameter relative to the destination telephony protocol.

51. The network node of claim 40, wherein:

the IP-based transport message includes the signaling message encapsulated within the generic transparency descriptor; and the parser is configured for determining the message identifier to specify, as the message type, an unrecognized message based on the message identifier specifying an unrecognized message code, and selectively generating the new signaling message based on the signaling message encapsulated within the generic transparency descriptor.

52. The network node of claim 51, wherein the parser is configured for:

detecting in the generic transparency descriptor an instruction that specifies a contingent response to the unrecognized message based on a determined inability to recognize the unrecognized message; and selectively executing the contingent response based on the determined inability to recognize the unrecognized message relative to the destination telephony protocol.

53. A computer readable medium having stored thereon sequences of instructions for interfacing between a source network having a source telephony protocol and a packet network configured for sending and receiving data according to Internet Protocol, the sequences of instructions including instructions for performing the steps of:

receiving a signaling message from the source network according to the source telephony protocol, the signaling message specifying a signaling operation to be executed according to the source telephony protocol;

generating an IP-based transport message having a generic transparency descriptor specifying generic attributes for describing the signaling message, the generic attributes including a protocol name that specifies the source telephony protocol relative to a prescribed set of source telephony protocol types, and a message identifier that specifies a message type according to the source telephony protocol; and outputting the IP-based transport message, having the generic transparency descriptor, to a node via the packet network.

54. The medium of claim 53, wherein the generating step includes generating the generic transparency descriptor as a prescribed MIME type, the outputting step including outputting the IP-based transport message according to one of Session Initiation Protocol (SIP) and H.323 protocol.

55. The medium of claim 54, wherein the generating step further includes specifying the generic attributes according to one of a text-based protocol that specifies the generic attributes as string literals, and a compact protocol that specifies the generic attributes without the string literals.

56. The medium of claim 53, wherein the generating step includes:

mapping bearer independent elements specified in the signaling message to a superset of normalized parameters for signaling message parameters among the prescribed set of source telephony protocol types; and generating the generic attributes based on the mapped bearer independent elements.

57. The medium of claim 56, wherein the superset of normalized parameters includes the signaling message parameters specified by ANSI T1.113 and ITU-T Q.761–Q.764 specifications implemented using an IP infrastructure.

58. The medium of claim 53, wherein the generating step includes:

determining an unrecognized field value associated with a recognized field tag in the signaling message, the recognized field tag associated with a recognized parameter of a recognized message type; and inserting, within the generic attributes, a known field compatability information parameter code that specifies the unrecognized field value.

59. The medium of claim 58, wherein the inserting step includes adding an instruction for the node that specifies a contingent response to the unrecognized field value based on the node being unable to recognize the unrecognized field value.

60. The medium of claim 53, wherein the generating step includes:

determining an unrecognized field tag in the signaling message, the unrecognized field tag associated with a recognized parameter of a recognized message type;

determining a presence of a best-fit field tag that approximates the unrecognized field tag; and inserting, within the generic attributes, an unknown field compatability information parameter code that specifies the unrecognized field tag and a corresponding field code specified within the signaling message, the generating step including selectively inserting the best-fit field tag based on the determined presence thereof.

61. The medium of claim 60, wherein the inserting step includes adding an instruction for the node that specifies a contingent response to the unrecognized field tag based on the node being unable to recognize the unrecognized field tag.

62. The medium of claim 53, wherein the generating step includes:

determining an unrecognized parameter in the signaling message, the unrecognized parameter associated with a recognized message type;

determining a presence of a best-fit parameter that approximates the unrecognized parameter; and inserting, within the generic attributes, a parameter compatability information code that specifies the unrecognized parameter and associated parameter values specified within the unrecognized parameter, the generating step including selectively inserting the best-fit parameter based on the determined presence thereof.

63. The medium of claim 62, wherein the inserting step includes adding an instruction for the node that specifies a contingent response to the unrecognized parameter based on the node being unable to recognize the unrecognized parameter.

64. The medium of claim 53, wherein the generating step includes:

determining the signaling message to be an unrecognized message;

encapsulating the signaling message within the IP-based transport message; and specifying, as the message identifier, an unrecognized message code that specifies the encapsulated signaling message.

65. The medium of claim 64, wherein the generating step further includes adding an instruction for the node that specifies a contingent response to the encapsulated signaling message based on the node being unable to recognize the encapsulated signaling message.

66. A computer readable medium having stored thereon sequences of instructions for interfacing between a packet network configured for sending and receiving data according to Internet Protocol and a destination network having a destination telephony protocol, the sequences of instructions including instructions for performing the steps of:

receiving an IP-based transport message having a generic transparency descriptor specifying generic attributes for describing a signaling message generated by a source network according to a source telephony protocol, the generic attributes including a protocol name and a message identifier;

determining the source telephony protocol relative to a prescribed set of source telephony protocol types based on parsing the protocol name, and a message type for the signaling message according to the source telephony protocol based on parsing the message identifier;

selectively generating the signaling message according to the destination telephony protocol based on the source telephony protocol and the determined message type; and selectively outputting a new signaling message, onto the destination network, representing the signaling message according to the destination telephony protocol.

67. The medium of claim 66, wherein the IP-based transport message includes a MIME body carrying the generic transparency descriptor, the method further comprising retrieving the generic transparency descriptor from the MIME body based on identifying the MIME body as a prescribed MIME type configured for carrying the generic transparency descriptor, the receiving step including receiving the IP-based transport message according to one of Session Initiation Protocol (SIP) and H.323 protocol.

68. The medium of claim 67, further comprising instructions for performing the step of identifying the generic transparency descriptor as implemented according to one of a text-based protocol that specifies the generic attributes as string literals, and a compact protocol that specifies the generic attributes without the string literals, based on a determined absence of a prescribed one of the string literals.

69. The medium of claim 66, wherein the determining step includes identifying the source telephony protocol and the message type based on comparing the protocol name and the message identifier to a prescribed superset of normalized parameters for signaling message parameters among the prescribed set of source protocol types.

70. The medium of claim 69, wherein the superset of normalized parameters includes the signaling message parameters specified by ANSI T1.113 and ITU-T Q.761–Q.764 specifications implemented using an IP infrastructure.

71. The medium of claim 66, wherein the selectively generating step includes:
detecting within the generic transparency descriptor a known field information parameter code that specifies a prescribed parameter code according to the source telephony protocol and a supplied unrecognized field value, and
selectively generating a new field value for the prescribed parameter code according to the destination telephony protocol, based on the known field information parameter code and the supplied unrecognized field value.

72. The medium of claim 71, further comprising instructions for performing the steps of:
detecting in the generic transparency descriptor an instruction that specifies a contingent response to the unrecognized field value based on a determined inability to recognize the unrecognized field value; and
selectively executing the contingent response based on the determined inability to recognize the unrecognized field value relative to the destination telephony protocol.

73. The medium of claim 66, wherein the selectively generating step includes:
detecting within the generic transparency descriptor an unknown field compatability information parameter code that specifies an unrecognized field tag and a corresponding field code according to the source telephony protocol, and a supplied best-fit field tag, and
selectively generating a new field tag and a corresponding new field code according to the destination telephony protocol, based on the best-fit field tag.

74. The medium of claim 71, further comprising instructions for performing the steps of:
detecting in the generic transparency descriptor an instruction that specifies a contingent response to the unrecognized field tag based on a determined inability to recognize the unrecognized field tag; and
selectively executing the contingent response based on the determined inability to recognize the unrecognized field tag relative to the destination telephony protocol.

75. The medium of claim 66, wherein the selectively generating step includes:
detecting within the generic transparency descriptor a parameter compatability code that specifies an unrecognized parameter relative to a recognized message type, and associated parameter values specified according to the source telephony protocol, and a supplied best-fit parameter, and
selectively generating a new parameter and corresponding parameter values according to the destination telephony protocol, based on the best-fit parameter.

76. The medium of claim 75, further comprising instructions for performing the steps of:
detecting in the generic transparency descriptor an instruction that specifies a contingent response to the unrecognized parameter based on a determined inability to recognize the unrecognized parameter; and
selectively executing the contingent response based on the determined inability to recognize the unrecognized parameter relative to the destination telephony protocol.

77. The medium of claim 66, wherein:
the IP-based transport message includes the signaling message encapsulated within the generic transparency descriptor;
the determining step includes determining the message identifier to specify, as the message type, an unrecognized message based on the message identifier specifying an unrecognized message code; and
the selectively generating step includes selectively generating the new signaling message based on the signaling message encapsulated within the generic transparency descriptor.

78. The medium of claim 77, further comprising instructions for performing the steps of:
detecting in the generic transparency descriptor an instruction that specifies a contingent response to the unrecognized message based on a determined inability to recognize the unrecognized message; and
selectively executing the contingent response based on the determined inability to recognize the unrecognized message relative to the destination telephony protocol.

79. A network node configured for interfacing between a source network having a source telephony protocol and a packet network configured for sending and receiving data according to Internet Protocol, the network node comprising:
means for receiving a signaling message from the source network according to the source telephony protocol, the signaling message specifying a signaling operation to be executed according to the source telephony protocol;
means for generating an IP-based transport message having a generic transparency descriptor specifying generic attributes for describing the signaling message, the generic attributes including a protocol name that specifies the source telephony protocol relative to a prescribed set of source telephony protocol types, and a message identifier that specifies a message type according to the source telephony protocol; and
means for outputting the IP-based transport message, having the generic transparency descriptor, to a node via the packet network.

80. The network node of claim 79, wherein the generating means is configured for generating the generic transparency descriptor as a prescribed MIME type, the outputting means configured for outputting the IP-based transport message according to one of Session Initiation Protocol (SIP) and H.323 protocol.

81. The network node of claim 79, wherein the generating means is configured for:

mapping bearer independent elements specified in the signaling message to a superset of normalized parameters for signaling message parameters among the prescribed set of source telephony protocol types; and generating the generic attributes based on the mapped bearer independent elements.

82. The network node of claim 81, wherein the superset of normalized parameters includes the signaling message parameters specified by ANSI T1.113 and ITU-T Q.761–Q.764 specifications implemented using an IP infrastructure.

83. The network node of claim 79, wherein the generating means is configured for:

determining an unrecognized field value associated with a recognized field tag in the signaling message, the recognized field tag associated with a recognized parameter of a recognized message type; and inserting, within the generic attributes, a known field compatability information parameter code that specifies the unrecognized field value, and an instruction for the node that specifies a contingent response to the unrecognized field value based on the node being unable to recognize the unrecognized field value.

84. The network node of claim 79, wherein the generating means is configured for:

determining an unrecognized field tag in the signaling message, the unrecognized field tag associated with a recognized parameter of a recognized message type;

determining a presence of a best-fit field tag that approximates the unrecognized field tag; and inserting, within the generic attributes, an unknown field compatability information parameter code that specifies the unrecognized field tag and a corresponding field code specified within the signaling message, the generating means configured for selectively inserting the best-fit field tag based on the determined presence thereof, and adding an instruction for the node that specifies a contingent response to the unrecognized field tag based on the node being unable to recognize the unrecognized field tag.

85. The network node of claim 79, wherein the generating means is configured for:

determining an unrecognized parameter in the signaling message, the unrecognized parameter associated with a recognized message type;

determining a presence of a best-fit parameter that approximates the unrecognized parameter; and inserting, within the generic attributes, a parameter compatability information code that specifies the unrecognized parameter and associated parameter values specified within the unrecognized parameter, the generating means configured for selectively inserting the best-fit parameter based on the determined presence thereof, and adding an instruction for the node that specifies a contingent response to the unrecognized parameter based on the node being unable to recognize the unrecognized parameter.

86. The network node of claim 79, wherein the generating means is configured for:

determining the signaling message to be an unrecognized message;

encapsulating the signaling message within the IP-based transport message; and specifying, as the message identifier, an unrecognized message code that specifies the encapsulated signaling message, and adding an instruction for the node that specifies a contingent response to the encapsulated signaling message based on the node being unable to recognize the encapsulated signaling message.

87. A network node configured for interfacing between a packet network configured for sending and receiving data according to Internet Protocol and a destination network having a destination telephony protocol, the network node comprising:

means for receiving an IP-based transport message having a generic transparency descriptor specifying generic attributes for describing a signaling message generated by a source network according to a source telephony protocol, the generic attributes including a protocol name and a message identifier;

means for determining the source telephony protocol relative to a prescribed set of source telephony protocol types based on parsing the protocol name, and a message type for the signaling message according to the source telephony protocol based on parsing the message identifier, and selectively generating the signaling message according to the destination telephony protocol based on the source telephony protocol and the determined message type; and means for selectively outputting a new signaling message, onto the destination network, representing the signaling message according to the destination telephony protocol.

88. The network node of claim 87, wherein the IP-based transport message includes a MIME body carrying the generic transparency descriptor, the determining means configured for retrieving the generic transparency descriptor from the MIME body based on identifying the MIME body as a prescribed MIME type configured for carrying the generic transparency descriptor, the receiving means configured for receiving the IP-based transport message according to one of Session Initiation Protocol (SIP) and H.323 protocol.

89. The network node of claim 87, wherein the determining means is configured for identifying the source telephony protocol and the message type based on comparing the protocol name and the message identifier to a prescribed superset of normalized parameters for signaling message parameters among the prescribed set of source protocol types.

90. The network node of claim 89, wherein the superset of normalized parameters includes the signaling message parameters specified by ANSI T1.113 and ITU-T Q.761–Q.764 specifications implemented using an IP infrastructure.

91. The network node of claim 87, wherein the determining means is configured for:

detecting within the generic transparency descriptor a known field information parameter code that specifies a prescribed parameter code according to the source telephony protocol and a supplied unrecognized field value, selectively generating a new field value for the prescribed parameter code according to the destination telephony protocol, based on the known field information parameter code and the supplied unrecognized field value, detecting in the generic transparency descriptor an instruction that specifies a contingent response to the unrecognized field value based on a determined inability to recognize the unrecognized field value; and selectively executing the contingent response based on the determined inability to recognize the unrecognized field value relative to the destination telephony protocol.

92. The network node of claim 87, wherein the determining means is configured for:
- detecting within the generic transparency descriptor an unknown field comparability information parameter code that specifies an unrecognized field tag and a corresponding field code according to the source telephony protocol, and a supplied best-fit field tag,
- selectively generating a new field tag and a corresponding new field code according to the destination telephony protocol, based on the best-fit field tag,
- detecting in the generic transparency descriptor an instruction that specifies a contingent response to the unrecognized field tag based on a determined inability to recognize the unrecognized field tag; and
- selectively executing the contingent response based on the determined inability to recognize the unrecognized field tag relative to the destination telephony protocol.

93. The network node of claim 87, wherein the determining means is configured for:
- detecting within the generic transparency descriptor a parameter comparability code that specifies an unrecognized parameter relative to a recognized message type, and associated parameter values specified according to the source telephony protocol, and a supplied best-fit parameter,
- selectively generating a new parameter and corresponding parameter values according to the destination telephony protocol, based on the best-fit parameter,
- detecting in the generic transparency descriptor an instruction that specifies a contingent response to the unrecognized parameter based on a determined inability to recognize the unrecognized parameter; and
- selectively executing the contingent response based on the determined inability to recognize the unrecognized parameter relative to the destination telephony protocol.

94. The network node of claim 87, wherein:
- the IP-based transport message includes the signaling message encapsulated within the generic transparency descriptor;
- the determining means is configured for:
- (1) determining the message identifier to specify, as the message type, an unrecognized message based on the message identifier specifying an unrecognized message code, and selectively generating the new signaling message based on the signaling message encapsulated within the generic transparency descriptor, and
- (2) detecting in the generic transparency descriptor an instruction that specifies a contingent response to the unrecognized message based on a determined inability to recognize the unrecognized message, and selectively executing the contingent response based on the determined inability to recognize the unrecognized message relative to the destination telephony protocol.

\* \* \* \* \*